No. 877,537.
PATENTED JAN. 28, 1908.
J. WHITING.
METHOD OF ELECTROLYZING SALTS.
APPLICATION FILED APR. 24, 1906. RENEWED JUNE 21, 1907.
3 SHEETS—SHEET 2.
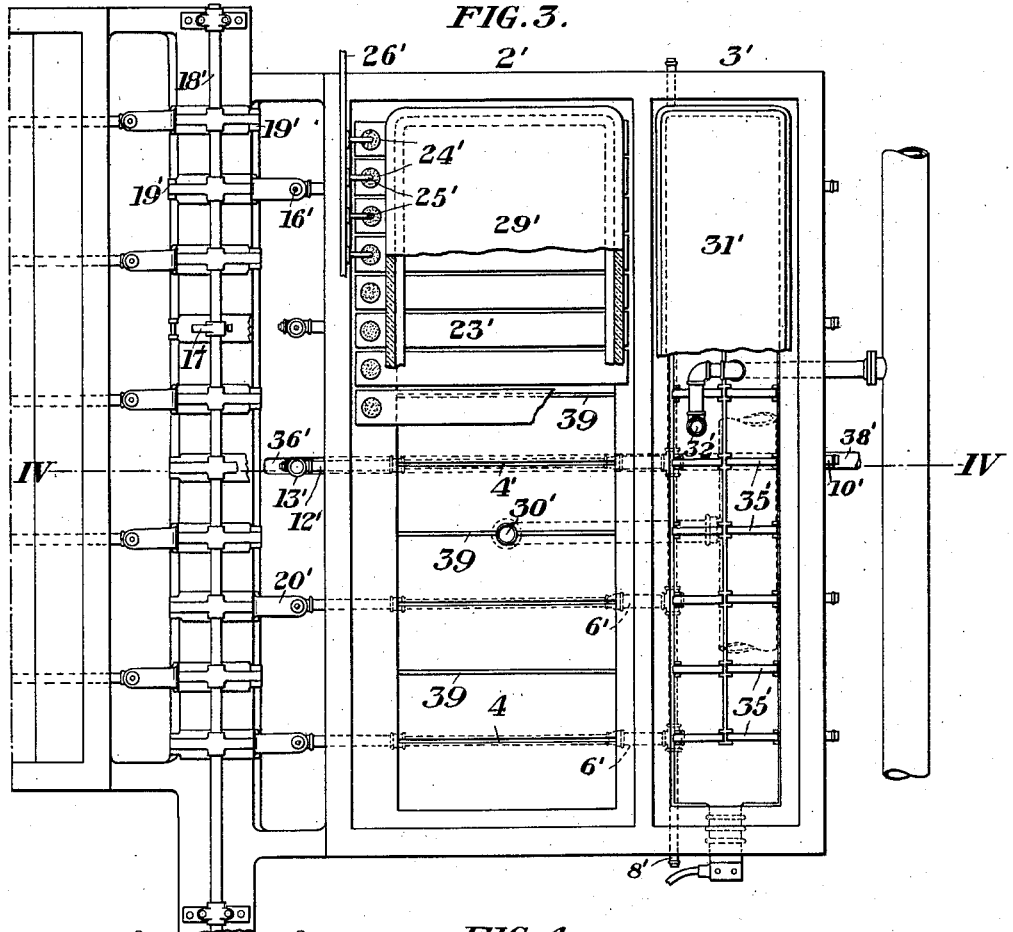
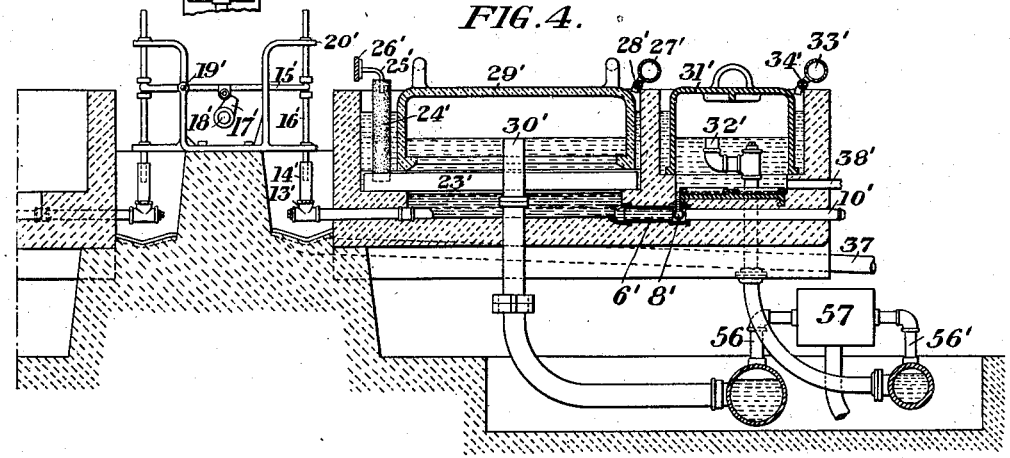
WITNESSES
INVENTOR No. 877,537. PATENTED JAN. 28, 1908.
J. WHITING.
METHOD OF ELECTROLYZING SALTS.
APPLICATION FILED APR. 24, 1906. RENEWED JUNE 21, 1907.
3 SHEETS—SHEET 3.
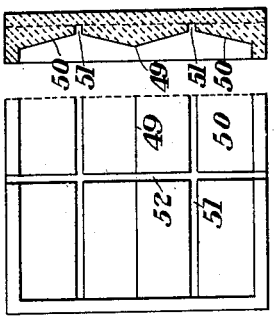
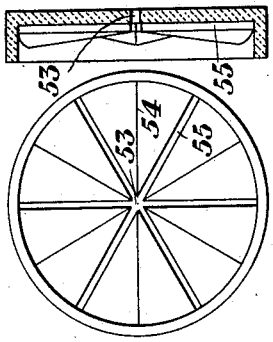
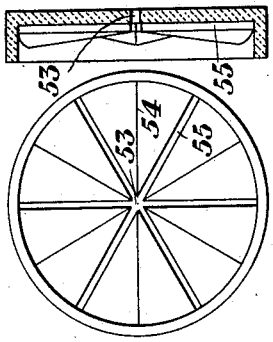
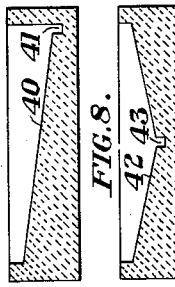
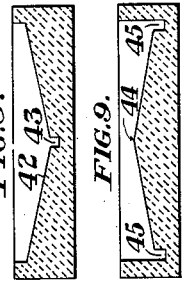
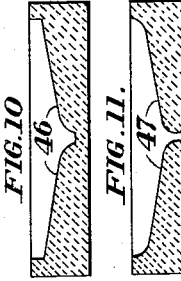
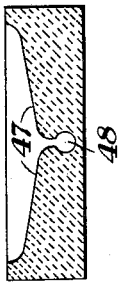
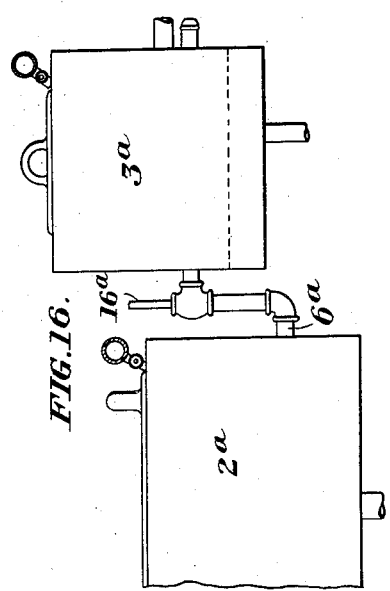
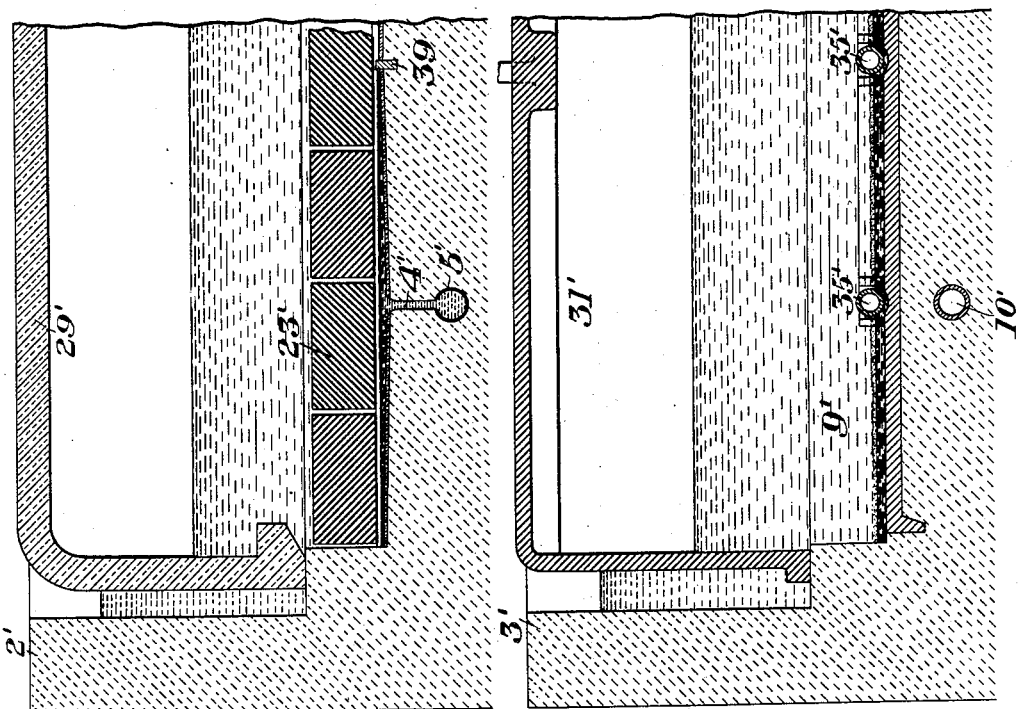
WITNESSES
R A Balderson
Warren W Swartz
INVENTOR
Jasper Whiting
by Beckwith Byrnes
his attys

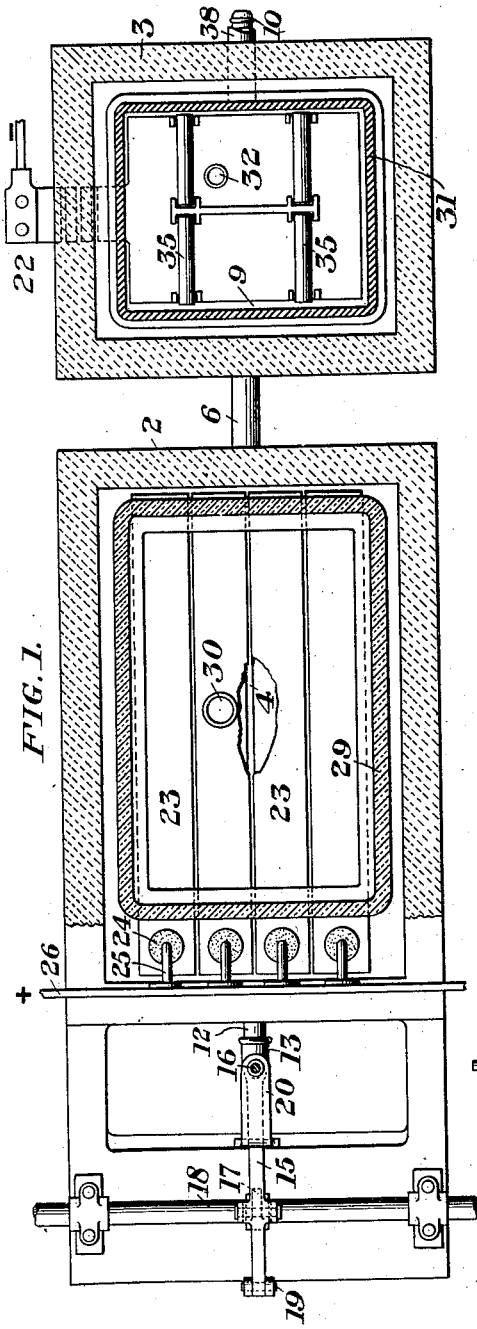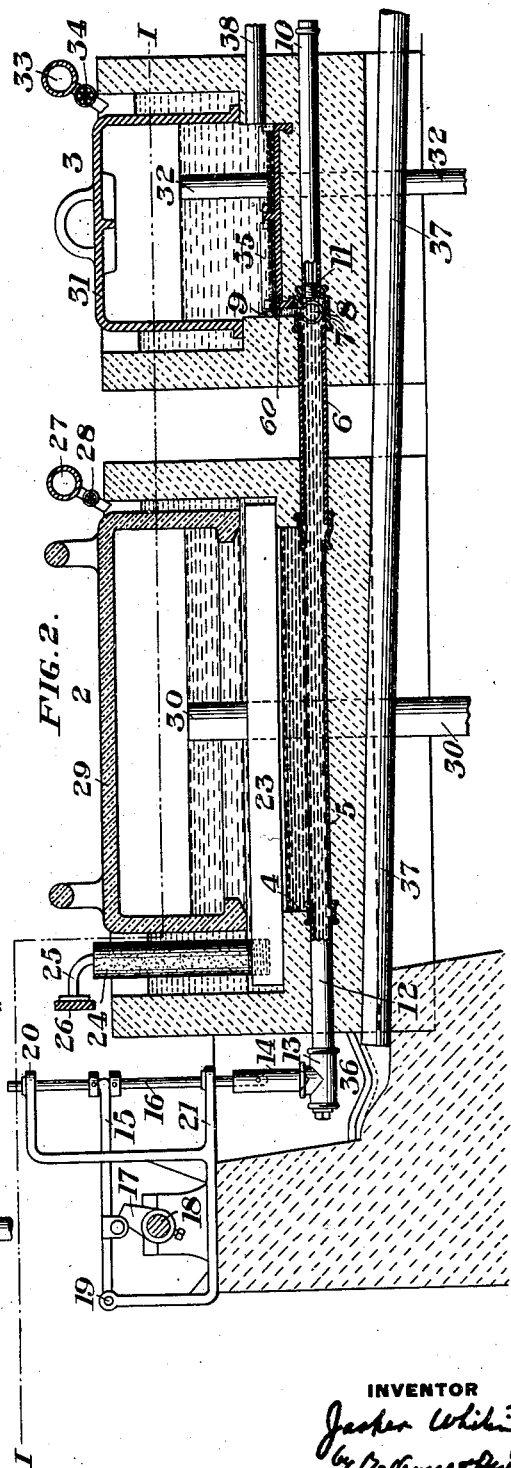

UNITED STATES PATENT OFFICE.

JASPER WHITING, OF NIAGARA FALLS, NEW YORK.

METHOD OF ELECTROLYZING SALTS.

No. 877,537.   Specification of Letters Patent.   Patented Jan. 28, 1908.

Application filed April 24, 1906. Serial No. 313,517. Renewed June 21, 1907. Serial No. 380,147.

*To all whom it may concern:*

Be it known that I, JASPER WHITING, of Niagara Falls, Niagara county, New York, have invented a new and useful Method of Electrolyzing Salts, of which the following is a full, clear, and exact description, reference being had to the accompanying drawings, forming part of this specification, in which—

Figure 1 is a sectional plan view showing one form of apparatus for carrying out my invention, on the line I—I of Fig. 2; Fig. 2 is a sectional side elevation of the form of Fig. 1; Fig. 3 is a sectional plan view showing the preferred form of my apparatus; Fig. 4 is a section on the line IV—IV of Fig. 3; Figs. 5 and 6 are enlarged sectional detail views of the decomposing chamber and oxidizing chamber, respectively of Figs. 3 and 4; Figs. 7, 8, 9, 10 and 11 are cross sections showing other forms of cell bottom; Figs. 12 and 13 are details of another form of bottom; Figs. 14 and 15 show a further form of bottom; and Fig. 16 is a detail showing a modified form of the valve arrangement.

My invention relates to the electrolyzing of salts, and to that class of electrolytic processes in which a liquid metal or alloy is used as a cathode. Heretofore where such a liquid metal or alloy has been supplied to and removed from the cell, the movement has been a substantially continuous circulation into or out of the cell. In such apparatus it has been found difficult to remove the amalgam or alloy formed by reason of the decomposition. For example, where sodium salts are decomposed in a cell having a mercury cathode, a semi-solid film of the sodium amalgam forms on the surface of the mercury. The flow of the metal from the decomposing cell or region fails completely to carry out all the amalgam as desired, since the flow of liquid metal or alloy takes place mainly under the film. This makes the flow un-uniform, and reaction ensues between the electrolyte and the film of amalgam, which decreases the efficiency of the electrolytic action. I have overcome this difficulty by dividing the movement of the mercury, or other liquid metal or alloy used as a cathode, into distinct periods. My process involves an intermittent action of the cell. During the decomposing period, the liquid metal or alloy cathode is maintained at a substantially constant level, and at a substantially constant distance (preferably very small) from the anode or anodes. During this period, therefore, there is a practically constant flow of electric current; moreover, the level of the liquid metal or alloy may be so arranged in relation to the anodes as to give the best economy. After decomposition has progressed for a time the liquid cathode is withdrawn, preferably as quickly as possible, and the decomposing action practically ceases. After the liquid cathode is thus withdrawn, a new supply of the liquid cathode is fed in, preferably to substantially the same level as before, this feeding in also taking place as quickly as possible. In the preferred form of my process, the metal which is withdrawn carrying the amalgam or product resulting from decomposition is purified in an oxidizing chamber or region, and the purified metal or alloy is then returned to the decomposing cell or region. By thus removing the cathode metal or alloy after the decomposing period, I can effectually withdraw substantially all the product or products resulting from decomposition which is supplied to the cathode, and thus maintain the efficiency of the cell.

In carrying out my process I preferably use a stationary cell of multiple type; though I may employ a single cell which may either have a single chamber or separate decomposing and oxidizing chambers. In case a single chamber is used, this would be a decomposing chamber and the material of the cathode would be withdrawn to be treated in any desirable way, a fresh metal or alloy supplied for the cathode from any desirable source.

In the drawings, I have shown in Figs. 1 and 2, one form of single cell having a decomposing chamber, and an oxidizing chamber. In these figures I show the cell proper which may consist of concrete molded into the shape of two blocks, one having the decomposing chamber 2, and the other the oxidizing chamber 3. The bottom of the anode or decomposing chamber is preferably formed of glass, though slate, cement or other hard smooth electrically non-conducting material may be used. The bottom preferably slopes from each side downwardly and inwardly to a central longitudinal slot 4. This slot is preferably provided with straight parallel sides, and embedded in the concrete below it, is a slotted pipe 5 whose slot registers with the slot in the cell bottom. From this pipe 5 a connecting pipe 6 leads to a connection 7 having a cross pipe 8 in the bottom of the oxidizing chamber. The cross pipe 8 is slotted in its top and opens into a slot 9 extending along the side of the cell bottom and opening into the cell. The connection 7 is also preferably provided with a channel or pipe 10 projecting through the cell bottom and provided with a movable closure 11. This pipe 10 may be used for cleaning purposes. The pipe 5 at its other end connects with a pipe 12 which extends through a wall of the cell to a valve casing 13. This upwardly extending arrangement of the valve casing insures a seal, and the height of this casing maintains the liquid metal or alloy at such a height in the cell as will prevent flowing out of the electrolyte. It will also prevent any corrosive action of the electrolyte upon the pipes which might occur if it was allowed to make contact with them. In this casing is located a valve 14 which is raised and lowered by means of a lever 15 having loose connection with the stem 16 of the valve. For operating this lever I have shown a cam 17 adjustably mounted on a rotating shaft 18 which causes the lever to swing up and down on its fulcrum 19. The stem 16 is guided in its vertical movements by suitable guides 20 and 21 on the framework. I have shown the anodes as consisting of graphite blocks or bars 23 which rest upon end ledges in the cell and connect by leading-in rods 24 with the connections 25 from the bus-bar 26, through which the current is supplied. In order to prevent evolution of gas outside the cell, I preferably coat or cover the rods 24, and that part of the anodes extending outside the bell, with an electrically non-conducting material such as paint, glass, &c.

27 represents a supply main for the electrolyte which is fed to the cell through the valve branch or branches 28.

29 is a bell or dome which rests upon side ledges of the cell and is sealed by its edges projecting down within the electrolyte. This bell is preferably formed of earthenware, though it may be made of any desirable material. The gas formed during the decomposing period may be led out in any desirable way. For this purpose I show a pipe 30 as projecting upwardly through the cell bottom at one side of the central slot; and when arranged in this manner, this pipe also serves as an overflow pipe for the electrolyte which is thereby maintained at a substantially constant level. The gas and the electrolyte will pass out through this pipe, and may be separated externally to the cell in any desirable manner.

The oxidizing cell is also shown as provided with a gas-collecting bell 31 which is preferably of iron and rests upon internal ledges in the cell. This cell is also preferably provided with a gas outlet and over-flow pipe 32 which is substantially similar to that of the decomposing chamber. The pipe 32 is preferably of iron while the pipe 30 is preferably made of earthenware or other non-corrosive material.

33 represents the main from which the electrolyte is supplied to the oxidizing chamber through the valve branch pipe or pipes 34. In the oxidizing cell, the mercury amalgam may be decomposed either by the direct action of a solvent or by electrolytic action. In the form shown I provide for electrolytic action in this cell, the amalgam supply from the decomposing chamber forming the anode, while the cathode preferably consists of particles of metal or other electrically conducting substances, preferably chrome iron. These particles float upon the anode and are preferably prevented from massing or collecting together, by riffles or seals 35. Instead of the iron filings or particles, an iron or metal electrode of ordinary type, either short-circuited with the amalgam, or made a part of the main electrical current, may be used.

When the valve 14 is raised from its seat the mercury or liquid metal alloy will overflow from the valve casing or pipe 13, and drop into the well 36 whence it flows through the inclined pipe 37 to a pump not shown. This pump acts to lift the amalgam or alloy supplied to it through pipe 37, and forces such material into the oxidizing compartment through pipe 38. The apparatus is preferably so arranged that the valve 14 will be closed at about the time when the amalgam has substantially all flowed out of the decomposing chamber, and at about the time when this amalgam begins to enter the oxidizing chamber. At about this time, the purified liquid metal or alloy will flow back from the oxidizing chamber through the pipe 6 into the pipe 5, and will rise in the decomposing chamber, until it has reached the desired level. When the desired level is reached the equilibrium of levels is established, and the metal will remain at this level through the decomposing period. The flow takes place through a closed circuit containing a substantially constant quantity of the liquid metal or alloy, and consequently the levels will establish themselves automatically.

The electric current flows in from the bus-bar 26 to the electrodes 23, thence through the electrolyte to the liquid metal cathode, from which it passes through the liquid metal column in the pipes 5 and 6, and through these pipes to the iron plate 60 forming the bottom of the oxidizing chamber, and which projects through the wall of this chamber. The current is then taken off from this iron plate, through the negative lead 22 fastened to it.

In carrying out my process with this apparatus, the valve 14 is closed and a quantity of mercury sufficient to entirely cover the floor of both compartments of the cell is fed in. The solution of the salt to be electrolyzed such as sodium chlorid, is allowed to flow into the decomposing chamber and water or a solution of the material to be formed, as caustic soda, or other substances, such as salts of ammonia, organic substances, etc., is fed into the oxidizing chamber. The levels of the two solutions are adjusted by means of the overflow pipes 30 and 32, so that the edges of both bells are immersed in the electrolytes, and the mercury covers the bottom of both chambers. By varying the depth of the electrolytes, a close adjustment may be made upon the levels of the mercury in the chambers. The current is then turned on, and flows through the cells as above described. The current acts to break up the electrolyte into its component ions, such as sodium and chlorin if sodium chlorid is used as the electrolyte. The sodium passes to the negative pole and amalgamates with the mercury while the chlorin escapes as a gas between the carbon anodes and collects in the bell from which it passes out through the pipe 30. Both the electrolytes are preferably fed into the chambers continuously and any excess flows out through the pipes 30 and 32. After the current has continued its action for a predetermined period depending upon the amount of sodium desired in the amalgam, the cam 17 acts upon the valve 14 to quickly open it. The mercury contained in the decomposing cell will flow out rapidly through the pipe 12 by reason of the great head and its high specific gravity, dropping into the well and flowing through pipe 37 to the pump which raises it into the oxidizing compartment, where it releases its sodium to the solution contained therein. The cam is preferably so arranged that as soon as a mechanically separated portion of the liquid metal cathode and preferably practically all of the mercury in the decomposing chamber is discharged, the valve 14 is closed, and mercury substantially free from sodium will flow from the oxidizing cell through pipes 6 and 5 and will rise through the slot 4 until the equilibrium is obtained. The slope of the bottom of the decomposing chamber is preferably so slight that although the mercury flows from it under a high head, there will be no substantial difference in head between the two chambers until the mercury in the decomposing chamber has all entered the slot. The amount of mercury in the slot is preferably small as compared to the amount of mercury lying in the cell proper when filled, so that when the mercury begins to leave the slot, a high difference of level between the two chambers is almost immediately established. When the decomposing chamber is practically empty, and the valve 14 closes, mercury will flow rapidly from the oxidizing chamber into the decomposing chamber until the desired level is reached. The flow of purified metal from the oxidizing chamber, preferably begins slightly before or at about the time when the amalgam in the decomposing chamber has entered the slot, but before it has all left the slot. The purified metal therefore acts to force out the amalgam remaining in the slot and pipe, and when forced out the valve closes, and the purified metal immediately rises rapidly in the decomposing chamber until equilibrium is established. The object of this peculiar arrangement of feeding connections is two-fold; first, making the periods of feeding-in and feeding-out the cathode for the decomposing compartment short as compared to the total period of the cycle; and second, to avoid complication of valve systems or means for raising or lowering one or both of the chambers. By this system, I avoid the use of special controlling devices for the inlet or feed-in channel of the decomposing chamber, while at the same time obtaining the quick inlet and outlet. This arrangement also adds to the safety of the apparatus which is not dependent upon the correct controlling action of a valve system for the inlet which is liable to get out of order. The movement of the mercury in the decomposing chamber also tends to agitate the electrolyte therein at a point in the cycle when the electrolyte is not appreciably in contact with the amalgam. This tends to displace any gas bubbles which may adhere to the anodes and at the same time maintains the electrolyte between the electrodes in a state of uniform concentration, thus insuring a minimum of electrical resistance in the cell and a long life to the anodes.

In Figs. 1 and 2, I have shown a simple form of single cell for carrying out my system. I prefer, however, to use a multiple cell system, as this is more compact and economical. Thus, in Figs. 3, 4, 5 and 6 I show a multiple system wherein the decomposing chamber 2' is enlarged to contain a common body of electrolyte, while the bottom is provided with dams or baffles 39 which extend transversely and divide the bottom into separate chambers or compartments for the liquid metal or alloy cathode. Each of the bottom compartments thus formed is preferably arranged in the same way as the single cell system above described, and similar parts are designated by similar numerals with the prime mark applied. In each of these bottom compartments, a slot and pipes 5' and 6' are used as in the single form. In this case, however, I have shown both chambers as formed of the same general body of concrete; and the pipe 6' extends through the dividing concrete partition between the two chambers. In this case, the pipe 8' extends the entire length of the oxidizing chamber, and is common to the several connecting pipes 6'. Also the gas and electrolyte out-flow pipes 30' and 32' for the two compartments are arranged one for each general chamber. I am thus able to avoid the introduction of the electrolytes into separate chambers while at the same time, I provide in effect separate chambers for the liquid metal or alloy. I am thus enabled to remove from or supply liquid metal or alloy to, one bottom compartment independently of the other bottom compartment, and can arrange the cams 17' to operate successively in any desired order. By this system I am also enabled to avoid the use of a short-circuiting device to cut out one cell from a number of cells arranged in series during the period when the current is not flowing to any substantial degree through the decomposing chamber. In this case the current is supplied continuously through the electrolyte and only varies slightly as the bottom compartments are successively emptied or re-supplied. During refilling of an empty compartment the liquid metal or alloy may flow to a slight degree from an adjacent decomposing compartment into the oxidizing chamber to, maintain the equilibrium of levels. The unit multiple cells may be of any desirable size, the bottom compartments being varied from two up to any desirable number. The cam shaft may also be utilized for controlling valves on each side thereof, and for cells arranged along the two sides of the shaft. If such cells are arranged in series, it is necessary to prevent short circuiting through the shaft by insulating the cells from each other. Thus in Fig. 1 I have shown the roller upon which the cam 18 operates, as having a bushing of fiber, or other electrically non-conducting material.

The shape and size of the bottom or bottoms may be varied in many ways, thus Figs. 7, 8, 9, 10 and 11 show different forms of contours of bottoms which may be used. In Fig. 7 I show the bottom 40 as inclined from one side of the cell to the other side, where is connects with a slot 41. This slot may be connected at one or both ends or at any other point with an outlet pipe or channel, and the inclination of the bottom may be either longitudinal or transverse. In Fig. 8, I show the bottom as having inclines 42 leading to a single slot 43 which may be connected to the outlet at any point or points. In Fig. 9 I show the bottom as having a central apex 44 which may extend longitudinally or transversely or both, the inclines leading outwardly and downwardly, to slots 45. In Fig. 10 I show a form similar to that of Fig. 8, except that the inclines 46 are curved or rounded, where they connect with the central slot. In Fig. 11 I show a form wherein the inclines 47 are rounded at their outer corners and also rounded where they connect with the slot which in this case leads to a slotted pipe 48.

In Figs. 12 and 13, I show the bottom as formed with a longitudinal central transverse apex 49, on each side of which the bottom is provided with slopes 50 which lead to transverse slots 51, from which the metal is led into the longitudinal slot 52. This slot may be connected at one or more points to the outlet.

In Figs. 14 and 15, I show a circular form having a central well or depression 53 and a series of radial ridges 54, between which the cell bottom slopes to radial slots 55 leading to a central outlet. The bottom of this case may be of inverted conical or funnel form instead of provided with separate ridges.

In Fig. 16 I show a form in which the floor of the oxidizing chamber 3$^a$ is above the level of the floor of the decomposing chamber 2$^a$. In this case the pipe 6$^a$ is provided with a valve having a stem 16$^a$ which may be controlled in any suitable manner, to govern the flow of purified metal from the oxidizing chamber to the decomposing chamber.

In any of the forms shown the connections to the anode and the cathode may be varied in any desirable manner. Thus it may be advisable in some cases to extend the anode connection through the bottom of the cell, permitting the bell to more completely cover the working area of the chamber. In this case carbon leading-in rods may be used which would extend downwardly instead of upwardly and dip into mercury cups, electrically connected with metal rods secured to the negative lead. In order to utilize the gases evolved during the operation of such a cell, I may lead the gas or gases to any suitable apparatus. Thus if sodium chlorid is electrolyzed, the chlorin evolved in the decomposing chamber may be used in making bleaching powder, carbon tetrachlorid, tin chlorid or other similar compounds; or the chlorin may be united by ignition with the hydrogen given off in the oxidizing chamber at a point exterior to such chamber in order to form hydro-chloric acid. Thus in Fig. 4, I show branch pipes 56 and 56' leading from the gas outlet pipes of the two chambers to hydrochloric acid making apparatus indicated diagrammatically at 57. My system is particularly adapted for this purpose, inasmuch as the compartments are separated by mercury seals and are covered by gas proof liquid sealed bells. It is thus impossible for the gases to accidentally mix within the cell, which might cause explosions; and contamination with other gases or substances by leakage to the air or otherwise is also avoided.

The advantages of my invention will be apparent to those skilled in the art. The disadvantages of the systems having continuous circulation of the liquid metal or alloy are avoided and the amalgam or alloy formed in the decomposing cell is easily and effectually removed. The reaction between this amalgam or alloy and the electrolyte is thus materially reduced, and the efficiency and economy of the cell thereby correspondingly increased. The reduction in economy resulting from constant changing of the level of the liquid metal or alloy is avoided, and the level may be maintained at substantially the proper point to give high efficiency through the decomposing period. The advantages of a stationary cell are obtained while the disadvantages of the former stationary cells are largely avoided. All parts of the apparatus are easily accessible. These and other advantages result from my intermittent system wherein the steps are divided into separated periods as distinguished from cells wherein substantially continuous circulation of the liquid metal or alloy is provided as in the United States Patents No. 518,135 granted April 10, 1894 and 528322 granted Oct. 30, 1894 to H. Y. Castner or where the liquid metal or alloy is stationary and a continuous withdrawal of the substance taken up by the liquid metal or alloy during decomposition, is provided for. I consider myself the first to provide for withdrawal and emptying of the liquid metal or alloy or a separated portion thereof at intermittent periods while maintaining a body of electrolyte in the decomposing chamber and maintaining a constant angular relation between the adjacent surfaces of the electrodes through the cycle of operations. The multiple cell arrangement is of especial advantage in giving a compact, easily operated system; the electrolyte is common to a number of bottom compartments; and there is no limit to the size of the cell. The complication of feeding electrolyte and taking off gas from different cells is thus reduced, while at the same time facility is given for carrying out the liquid metal or alloy from one bottom compartment independently of the others. These periods may therefore follow each other in any desirable succession, and may be of any desired length or duration.

With any form of my system, the distance between the liquid metal or alloy, and the anode or anodes in the decomposing chamber may be made very small so as to give high economy; and owing to the substantially constant level during substantially all of the decomposing period this high economy is obtained substantially throughout this entire period as distinguished from a practically continuous changing of levels during this period. The withdrawing of practically the entire body of the liquid metal or alloy together with the substance added thereto during the decomposing period, insures the proper removal of the substances, and greatly decreases reactions which would lower the efficiency of the cell.

It will be observed that by reason of the fact that the cell is stationary, the adjacent surfaces of the electrodes are maintained in the same angular relation throughout the cycle of operations. This enables the resistance of the cells to be kept at the minimum, while the preferable parallel relation between the electrodes gives a uniform current density; whereas in cells which are continuously or intermittently tilted to effect the discharge of the amalgam or alloy, the shifting of the cathodes and the tilting of the anodes changes their relative angular relation, with consequent non-uniformity of current density, and makes it necessary to space the electrodes more widely apart, increasing the resistance.

The cell may be made with one or more chambers of any desirable form or size. If two or more chambers are used, they may be on the same or different levels. The connections for supplying and withdrawing the liquid metal or alloy may be changed, and if valves are used, such valves may be varied in any desirable way. Floats or other controlling devices than valves may be employed. The bottom of either or both chambers may be varied in shape, and the point or points of feeding in or taking out the liquid metal or alloy may be varied. The electrical connections may be changed in form or point of connection. Although my process is particularly applicable to the electrolysis of salts in aqueous solution,— especially salts of the alkali metals—, yet the process is applicable to electrolysis of salts in non-aqueous solutions and of fused salts. Instead of mercury, fused metal or alloy may be used as the cathode in the decomposing chamber; and many other changes may be made without departing from my invention.

I claim:—

1. The method of effecting electrolytic decomposition of salts, consisting in passing an electric current through the electrolyte to a mass of liquid metal, and maintaining substantially the same mass of liquid metal as a cathode for a period of time, then, while maintaining a body of electrolyte in the decomposing chamber, withdrawing the mass of liquid metal, and replacing it with a fresh mass of liquid metal, the same angular relation between the adjacent surfaces of the electrodes being maintained throughout the cycle of operations; substantially as described.

2. The method of effecting electrolytic decomposition of salts, consisting in passing an electric current through the electrolyte to a mass of liquid metal beneath it, and maintaining substantially the same mass of liquid metal as a cathode for a period of time, then, while maintaining a body of electrolyte in the decomposing chamber, withdrawing the mass of liquid metal, and replacing it with a fresh mass of liquid metal, the same angular relation between the adjacent surfaces of the electrodes being maintained throughout the cycle of operations; substantially as described.

3. The method of effecting electrolytic decomposition of salts, consisting in passing an electric current through the electrolyte to a mass of liquid metal, and maintaining substantially the same mass of liquid metal at a practically constant level, as a cathode for a period of time, then while maintaining a body of electrolyte in the decomposing chamber, withdrawing the mass of liquid metal, and replacing it with a fresh mass of liquid metal, the same angular relation between the adjacent surfaces of the electrodes being maintained throughout the cycle of operations; substantially as described.

4. The method of effecting electrolytic decomposition of salts consisting in passing an electric current through the electrolyte to a mass of liquid metal beneath it, maintaining substantially the same mass of liquid metal at a practically constant level as a cathode for a period of time, then withdrawing the mass of liquid metal from this position, and replacing it with a fresh mass of liquid metal, the same angular relation between the adjacent surfaces of the electrodes being maintained throughout the cycle of operations; substantially as described.

5. The method of effecting electrolytic decomposition of salts, consisting in passing an electric current through an electrolyte containing the same to a body of liquid metal, maintaining substantially the same mass of liquid metal as a cathode through a period of time, then withdrawing this mass of liquid metal to a point where it is freed from the material received during said period, and returning said purified metal to the decomposing chamber, the same angular relation between the adjacent surfaces of the electrodes being maintained throughout the cycle of operations; substantially as described.

6. The method of effecting electrolytic decomposition of salts, consisting in passing an electric current through an electrolyte containing the same to a body of liquid metal beneath it, maintaining said liquid metal at a practically constant level through a period of time, then withdrawing the body of liquid metal, and supplying another body of liquid metal, the same angular relation between the adjacent surfaces of the electrodes being maintained throughout the cycle of operations; substantially as described.

7. The method of effecting electrolytic decomposition of salts, consisting in passing an electric current through an electrolyte containing the same to a body of liquid metal beneath it, maintaining said liquid metal at a practically constant level through a period of time, then transferring substantially all of the alloy or amalgam thus formed to a point outside the decomposing chamber, and supplying another body of liquid metal, the same angular relation between the adjacent surfaces of the electrodes being maintained throughout the cycle of operations; substantially as described.

8. The method of effecting electrolytic decomposition of a salt of an alkaline metal consisting in passing an electric current through an electrolyte containing the same to a body of liquid metal beneath it, maintaining said liquid metal at a practically constant level through a period of time, then withdrawing the body of liquid metal, and supplying another body of liquid metal, the same angular relation between the adjacent surfaces of the electrodes being maintained throughout the cycle of operations; substantially as described.

9. The method of effecting electrolytic decomposition of salts, consisting in passing an electric current through an electrolyte containing the same to a body of liquid metal beneath it in a stationary decomposing chamber, maintaining said liquid metal at a practically constant level through a period of time, then withdrawing the body of liquid metal, and supplying another body of liquid metal, the same angular relation between the adjacent surfaces of the electrodes being maintained throughout the cycle of operations; substantially as described.

10. The method of effecting electrolytic decomposition of salts, consisting in passing an electric current through an electrolyte containing the same to a body of liquid metal beneath it, maintaining said liquid metal at a practically constant level through a period of time, then withdrawing the body of liquid metal to a point where it is freed from the material received by it during the decomposition period, and returning said purified metal to the decomposing chamber, the same angular relation between the adjacent surfaces of the electrodes being maintained throughout the cycle of operations; substantially as described.

11. The method of effecting electrolytic decomposition of salts, consisting in passing an electric current through an electrolyte containing the same to a body of liquid metal beneath it in a decomposing chamber, maintaining said liquid metal at a practically constant level through a period of time, then withdrawing the body of liquid metal to an oxidizing zone, therein oxidizing and removing the material received during the first period, and returning the purified metal to the decomposition chamber, the same angular relation between the adjacent surfaces of the electrodes being maintained throughout the cycle of operations; substantially as described.

12. The method of effecting electrolytic decomposition of salts, consisting in passing an electric current through an electrolyte containing the same to a body of liquid metal beneath it in a decomposing chamber, maintaining another body of liquid metal in an oxidizing chamber or region, and balancing the two bodies of liquid metal in equilibrium during substantially the entire decomposition period, the same angular relation between the adjacent surfaces of the electrodes being maintained throughout the cycle of operations; substantially as described.

13. The method of effecting electrolytic decomposition of salts, consisting in passing an electric current through an electrolyte containing the same to a body of liquid metal, maintaining substantially the same mass of liquid metal as a cathode through a period of time, then withdrawing this mass of liquid metal by gravity and supplying another body of liquid metal, the same angular relation between the adjacent surfaces of the electrodes being maintained throughout the cycle of operations; substantially as described.

14. The method of effecting electrolytic decomposition of salts, consisting in passing an electric current through an electrolyte containing the same to separated bodies of liquid metal beneath said electrolyte, and removing and re-supplying these bodies of liquid metal independently of each other; substantially as described.

15. The method of effecting electrolytic decomposition of salts, consisting in passing an electric current through an electrolyte containing the same to separated bodies of liquid metal beneath said electrolyte, removing said bodies of metal independently of each other to a common oxidizing chamber, treating them therein, and returning the purified metal to a decomposing chamber; substantially as described.

16. The method of effecting electrolytic decomposition of salts of the alkali metals, consisting in passing an electric current through an electrolyte containing the same to a body of liquid metal beneath it in a decomposing chamber, maintaining the same mass of liquid metal as a cathode through a period of time, then withdrawing this same mass of liquid metal to an oxidizing zone, oxidizing and removing the material received during the decomposition period, combining the gases from the decomposing and oxidizing regions, and returning the purified metal or alloy to the decomposing chamber, the same angular relation between the adjacent surfaces of the electrodes being maintained throughout the cycle of operations; substantially as described.

17. The method of effecting electrolytic decomposition of salts, consisting in passing an electric current through an electrolyte containing the same to a body of liquid metal beneath it, maintaining the same mass of liquid metal as a cathode through a period of time, simultaneously maintaining in an oxidizing chamber another mass of the liquid metal or alloy carrying the substance of decomposition at the same level and in balanced relation to the cathode metal, withdrawing the mass of liquid metal from the decomposing chamber, returning the purified metal from the oxidizing chamber to the decomposing chamber, and reëstablishing the same levels; substantially as described.

18. The method of effecting electrolytic decomposition of salts, consisting in passing an electric current through an electrolyte containing the same to a body of liquid metal, maintaining substantially the same mass of liquid metal as a cathode through a period of time, then flowing out the liquid metal along an inclined surface to an outlet, and supplying another body of liquid metal, the same angular relation between the adjacent surfaces of the electrodes being maintained through the cycle of operations; substantially as described.

19. The method of effecting electrolytic decomposition of salts, consisting in passing an electric current through an electrolyte containing the same to a body of liquid metal, maintaining substantially the same mass of liquid metal as a cathode through a period of time, then flowing out the liquid metal through a bottom slot or slots of small area compared with the bottom area of the cell, and supplying another body of liquid metal, the same angular relation between the adjacent surfaces of the electrodes being maintained throughout the cycle of operations; substantially as described.

20. The method of effecting electrolytic decomposition of salts, consisting in passing an electric current through an electrolyte containing the same to a body of liquid metal, maintaining substantially the same mass of liquid metal as a cathode through a period of time, then withdrawing substantially the entire mass of liquid metal or alloy in a period of time less than said period, and supplying another body of liquid metal, the same angular relation between the adjacent surfaces of the electrodes being maintained throughout the cycle of operations; substantially as described.

21. The method of effecting electrolytic decomposition of salts, consisting in passing an electric current through an electrolyte containing the same to a body of liquid metal, maintaining substantially the same mass of liquid metal as a cathode through a period of time, withdrawing this mass of liquid metal, and supplying another body of liquid metal in a period of time less than said period, the same angular relation between the adjacent surfaces of the electrodes being maintained throughout the cycle of operations; substantially as described.

22. The method of effecting electrolytic decomposition of salts, consisting in passing an electric current through an electrolyte containing the same to separate cathode bodies of liquid metal, maintaining substantially the same mass of liquid metal in each body through a period of time, then withdrawing a cathode body of liquid metal, and supplying another body of liquid metal independently of any substantial withdrawal of another cathode body; substantially as described.

23. The method of effecting electrolytic decomposition of salts, consisting in passing an electric current through a solution containing the same to liquid metal beneath it, said metal being divided into sections substantially mechanically separated from but electrically connected with each other, withdrawing the amalgam or alloy in the sections successively, and replacing it with purified metal; substantially as described.

24. The method of effecting electrolytic decomposition of salts of the alkali metals, consisting in passing an electric current through an electrolyte containing the same to a body of liquid metal beneath it in a decomposing chamber, maintaining the same mass of liquid metal as a cathode through a period of time, then withdrawing this same mass of liquid metal to an oxidizing zone, treating it therein with a solution chemically or electro-chemically active therewith, and returning the purified metal or alloy to the decomposing chamber, the same angular relation between the adjacent surfaces of the electrodes being maintained throughout the cycle of operations; substantially as described.

In testimony whereof, I have hereunto set my hand.

JASPER WHITING.

Witnesses:
JOHN MILLER,
H. M. CORWIN.